United States Patent
Chiou et al.

(10) Patent No.: US 6,635,211 B2
(45) Date of Patent: Oct. 21, 2003

(54) REINFORCED POLISHING PAD FOR LINEAR CHEMICAL MECHANICAL POLISHING AND METHOD FOR FORMING

(75) Inventors: Wen-Chih Chiou, Miaoli (TW); Ying-Ho Chen, Taipei (TW); Tsu Shih, Hsin Chu (TW); Syun-Ming Jang, Hsin-Chu (TW)

(73) Assignee: Taiwan Semiconductor Manufacturing Co. Ltd, Hsin Chu (TW)

(*) Notice: Subject to any disclaimer, the term of this patent is extended or adjusted under 35 U.S.C. 154(b) by 8 days.

(21) Appl. No.: 09/888,789

(22) Filed: Jun. 25, 2001

(65) Prior Publication Data

US 2003/0013398 A1 Jan. 16, 2003

(51) Int. Cl.$^7$ .......................... B29C 39/12; B29C 70/14
(52) U.S. Cl. ................. 264/155; 264/255; 264/257; 264/258; 264/271.1; 264/299; 264/319; 264/324; 264/327; 156/245
(58) Field of Search ................ 264/255, 257, 264/258, 263, 266, 271.1, 279.1, 154, 155, 299, 324, 327; 156/245

(56) References Cited

U.S. PATENT DOCUMENTS

| | | | | |
|---|---|---|---|---|
| 4,511,605 A | * | 4/1985 | McCartney | 427/246 |
| 4,728,552 A | * | 3/1988 | Jensen, Jr. | 428/91 |
| 4,927,432 A | * | 5/1990 | Budinger et al. | 51/298 |
| 5,106,438 A | * | 4/1992 | Nopper et al. | 156/62.8 |
| 5,441,598 A | * | 8/1995 | Yu et al. | 156/645.1 |
| 5,578,362 A | * | 11/1996 | Reinhardt et al. | 428/147 |
| 5,609,517 A | * | 3/1997 | Lofaro | 451/259 |
| 5,639,328 A | * | 6/1997 | Rossi | 156/193 |
| 5,913,713 A | * | 6/1999 | Cheek et al. | 451/41 |
| 6,306,008 B1 | * | 10/2001 | Moore | 451/5 |
| 6,315,857 B1 | * | 11/2001 | Cheng et al. | 156/345 |
| 6,352,595 B1 | * | 3/2002 | Svirchevski et al. | 134/3 |

FOREIGN PATENT DOCUMENTS

EP          0 039 588 A2  * 11/1981

* cited by examiner

Primary Examiner—Stefan Staicovici
(74) Attorney, Agent, or Firm—tung & associates

(57) ABSTRACT

A continuous loop polishing pad that is reinforced by a reinforcing filler and a method for fabricating the polishing pad are described. The reinforced polishing pad is constructed by a sub-layer and a top layer, wherein the sub-layer defines an inner diameter of the polishing pad and contains a reinforcing filler with an aspect ratio of at least 10 oriented substantially in a circumferential direction of the continuous loop polishing pad. The top layer is laminated to the sub-layer with a top surface defining an outer diameter of the polishing pad, while both the sub-layer and the top layer are formed of a polymeric material. The invention further describes a method for fabricating the reinforced polishing pad in a continuous loop.

10 Claims, 2 Drawing Sheets

REINFORCED POLISHING PAD FOR LINEAR CHEMICAL MECHANICAL POLISHING AND METHOD FOR FORMING

FIELD OF THE INVENTION

The present invention generally relates to a polishing pad for linear chemical mechanical polishing and method for forming and more particularly, relates to a polishing pad for linear chemical mechanical polishing that is reinforced by reinforcing fillers for improved creep resistance and a method for forming the reinforced polishing pad.

BACKGROUND OF THE INVENTION

In the fabrication of semiconductor devices from a silicon wafer, a variety of semiconductor processing equipment and tools are utilized. One of these processing tools is used for polishing thin, flat semiconductor wafers to obtain a planarized surface. A planarized surface is highly desirable on a shallow trench isolation (STI) layer, on an inter-layer dielectric (ILD) or on an inter-metal dielectric (IMD) layer which are frequently used in memory devices. The planarization process is important since it enables the use of a high resolution lithographic process to fabricate the next level circuit. The accuracy of a high resolution lithographic process can be achieved only when the process is carried out on a substantially flat surface. The planarization process is therefore an important processing step in the fabrication of semiconductor devices.

A global planarization process can be carried out by a technique known as chemical mechanical polishing or CMP. The process has been widely used on ILD or IMD layers in fabricating modern semiconductor devices. A CMP process is performed by using a rotating platen in combination with a pneumatically actuated polishing head. The process is used primarily for polishing the front surface or the device surface of a semiconductor wafer for achieving planarization and for preparation of the next level processing. A wafer is frequently planarized one or more times during a fabrication process in order for the top surface of the wafer to be as flat as possible. A wafer can be polished in a CMP apparatus by being placed on a carrier and pressed face down on a polishing pad covered with a slurry of colloidal silica or aluminum.

A polishing pad used on a rotating platen is typically constructed in two layers overlying a platen with a resilient layer as an outer layer of the pad. The layers are typically made of a polymeric material such as polyurethane and may include a filler for controlling the dimensional stability of the layers. A polishing pad is typically made several times the diameter of a wafer, in a conventional rotary CMP, while the wafer is kept off-center on the pad in order to prevent polishing a non-planar surface onto the wafer. The wafer itself is also rotated during the polishing process to prevent polishing a tapered profile onto the wafer surface. The axis or rotation of the wafer and the axis of rotation of the pad are deliberately not collinear, however, the two axes must be parallel. It is known that uniformity in wafer polishing by a CMP process is a function of pressure, velocity and concentration of the slurry used.

The polishing or the removal of surface layers is accomplished by a polishing slurry consisting mainly of colloidal silica suspended in deionized water or KOH solution. The slurry is frequently fed by an automatic slurry feeding system in order to ensure the uniform wetting of the polishing pad and the proper delivery and recovery of the slurry. For a high volume wafer fabrication process, automated wafer loading/unloading and a cassette handler are also included in a CMP apparatus.

As the name implies, a CMP process executes a microscopic action of polishing by both chemical and mechanical means. While the exact mechanism for material removal of an oxide layer is not known, it is hypothesized that the surface layer of silicon oxide is removed by a series of chemical reactions which involve the formation of hydrogen bonds with the oxide surface of both the wafer and the slurry particles in a hydrogenation reaction; the formation of hydrogen bonds between the wafer and the slurry; the formation of molecular bonds between the wafer and the slurry; and finally, the breaking of the oxide bond with the wafer or the slurry surface when the slurry particles moves away from the wafer surface. It is generally recognized that the CMP polishing process is not a mechanical abrasion process of slurry against a wafer surface.

While the rotary CMP process provides a number of advantages over the traditional mechanical abrasion type polishing process, a serious drawback for the rotary CMP process is the difficulty in controlling polishing rates and different locations on a wafer surface. Since the polishing rate applied to a wafer surface is generally proportional to the relative velocity of the polishing pad, the polishing rate at a specific point on the wafer surface depends on the distance from the axis of rotation. In other words, the polishing rate obtained at the edge portion of the wafer that is closest to the rotational axis of the polishing pad is less than the polishing rate obtained at the opposite edge of the wafer. Even though this is compensated by rotating the wafer surface during the polishing process such that a uniform average polishing rate can be obtained, the wafer surface, in general, is exposed to a variable polishing rate during the CMP process.

More recently, a new chemical mechanical polishing method has been developed in which the polishing pad is not moved in a rotational manner but instead, in a linear manner. It is therefore known as a linear chemical mechanical polishing process in which a polishing pad is moved in a linear manner in relation to a rotating wafer surface. The linear polishing method provides a more uniform polishing rate across a wafer surface throughout a planarization process for uniformly removing a film layer on the surface of a wafer. One added advantage of the linear CMP system is the simpler construction of the apparatus and therefore not only reducing the cost of the apparatus but also reduces the floor space required in a clean room environment.

A typical linear CMP apparatus 10 is shown in FIGS. 1A and 1B. The linear CMP apparatus 10 is utilized for polishing a semiconductor wafer 24, i.e., a silicon wafer for removing a film layer of either an insulating material or a wafer from the wafer surface. For instance, the film layer to be removed may include insulating materials such as silicon oxide, silicon nitrite or spin-on-glass material or a metal layer such as aluminum, copper or tungsten. Various other materials such as metal alloys or semi-conducting materials such as polysilicon may also be removed.

As shown in FIGS. 1A and 1B, the wafer 24 is mounted on a rotating platform, or wafer holder 18 which rotates at a pre-determined speed. The major difference between the linear polisher 10 and a conventional CMP is that a continuous, or endless belt 12 is utilized instead of a rotating polishing pad. The belt 12 moves in a linear manner in respect to the rotational surface of the wafer 24. The linear belt 12 is mounted in a continuous manner over a pair of rollers 14 which are, in turn, driven by a motor means (not shown) at a pre-determined rotational speed. The rotational motion of the rollers 14 is transformed into a linear motion 26 in respect to the surface of the wafer 24. This is shown in FIG. 1B.

In the linear polisher 10, a polishing pad 30 is adhesively joined to the continuous belt 12 on its outer surface that faces the wafer 24. A polishing assembly 38 is thus formed by the continuous belt 12 and the polishing pad 30 glued thereto. As shown in FIG. 1A, a plurality of polishing pads 30 are utilized which are frequently supplied in rectangular-shaped pieces with a pressure sensitive layer coated on the back side.

The wafer platform 18 and the wafer 24 form an assembly of a wafer carrier 28. The wafer 24 is normally held in position by a mechanical retainer, commonly known as a retaining ring 16, as shown in FIG. 1B. The major function of the retaining ring 16 is to fix the wafer in position in the wafer carrier 28 during the linear polishing process and thus preventing the wafer from moving horizontally as wafer 24 contacts the polishing pad 30. The wafer carrier 28 is normally operated in a rotational mode such that a more uniform polishing on wafer 24 can be achieved. To further improve the uniformity of linear polishing, a support housing 32 is further utilized to provide support to platen 22 during a polishing process. The platen 22 provides a supporting platform for the underside of the continuous belt 12 to ensure that the polishing pad 30 makes sufficient contact with the surface of wafer 24 in order to achieve more uniform removal in the surface layer. Typically, the wafer carrier 28 is pressed downwardly against the continuous belt 12 and the polishing pad 30 at a predetermined force such that a suitable polishing rate on the surface of wafer 24 can be obtained. A desirable polishing rate on the wafer surface can therefore be obtained by suitably adjusting forces on the support housing 32, the wafer carrier 28, and the linear speed 26 of the polishing pad 30. A slurry dispenser 20 is further utilized to dispense a slurry solution 34.

A typical polishing pad formation process is shown in a flow chart in FIG. 2. The polishing pad formation process 40 is started by first providing a die cavity and filling the die cavity (step 42) with a polymeric material such as polyurethane. After a continuous belt is casted in the die cavity, the belt is cured at a suitable curing temperature (step 44) for the polyurethane material. In the next step, step 46, the continuous belt is cleaned and finished by removing excessive molding material from the belt surface and by polishing the surface until it is perfectly flat. A plurality of shallow surface grooves is then provided in step 48 on the top surface of the belt. The grooves are formed in a direction that is parallel to a circumferential direction of the belt. In the next process step 50, a window is cut out from the continuous belt in order to allow end point detection of the polishing process. Normally, a 1" diameter section of the polyurethane belt is removed to form the window. In a final step 52 of the process, the continuous belt formed is inspected and finally cleaned.

In the conventional linear polisher 10, the continuous belt 12 is under constant tension exerted by the pair of rollers 14 such that the belt 12 is tightly stretched over the rollers 14 for conducting the polishing process. Since the continuous belt 12 is normally formed of a polymeric material, such as polyurethane, which is subjected to viscoelastic creep after prolonged usage, the belt 12 becomes loose under the high tensile stress. As a result, the lifetime of a polishing pad is not only limited by pad wear, but also limited by the pad deformation. The creep or excessive elongation of the continuous belt contributes to polishing pad failure if not prevented.

It is therefore an object of the present invention to provide a continuous loop polishing pad that does not have the drawbacks or shortcomings of the conventional polishing pad for use in linear chemical mechanical polishing.

It is another object of the present invention to provide a continuous loop polishing pad that is reinforced by a reinforcing filler that is added to a polymeric material used in forming the pad.

It is a further object of the present invention to provide a continuous loop polishing pad reinforced by a reinforcing filler selected from a reinforcing fiber, a reinforcing whisker and a non-woven fiber mat.

It is another further object of the present invention to provide a continuous loop polishing pad reinforced by a reinforcing filler wherein the reinforcing filler is a long fiber or chopped fibers.

It is still another object of the present invention to provide a continuous loop polishing pad reinforced by a reinforcing filler wherein the filler is coated with a wetting agent.

It is yet another object of the present invention to provide a continuous loop polishing pad that is reinforced by at least 10 weight % of a reinforcing filler.

It is still another further object of the present invention to provide a continuous loop polishing pad reinforced by a reinforcing filler which has an aspect ratio of at least 10.

It is yet another further object of the present invention to provide a method for fabricating a polishing pad in a continuous loop that is reinforced by a reinforcing filler for achieving improved creep resistance.

SUMMARY OF THE INVENTION

In accordance with the present invention, a polishing pad for linear chemical mechanical polishing that is reinforced by a reinforcing filler added to the pad material and a method for forming the pad are disclosed.

In a preferred embodiment, a method for fabricating a polishing pad in a continuous loop reinforced by a reinforcing filler can be carried out by the operating steps of providing a die that has a cavity in the shape of a continuous loop defined by an inner die face and an outer die face; applying a reinforcing filler which has an aspect ratio of at least 10 on the inner die face, the filler is oriented substantially in a circumferential direction of the continuous loop; filling the cavity partially with a polymeric material encapsulating the reinforcing filler to form a sub-layer of the polishing pad; and filling the cavity completely with a polymeric material laminating to the sub-layer forming the polishing pad.

The method for fabricating a polishing pad in a continuous loop reinforced by a reinforcing filler may further include the step of conducting a first curing process on the sub-layer and a second curing process on the polishing pad. The method may further include the step of forming surface grooves of an outer surface of the continuous loop polishing pad in a direction parallel to a circumferential direction of the loop. The method may further include the step of applying a reinforcing filler selected from the group consisting of reinforcing fiber, reinforcing whisker and non-woven fiber mat. The method may further include the step of providing a die that has a cavity in the shape of a circular loop, or the step of cutting an aperture in the polishing pad for end point detection, or the step of filling the cavity with a polyurethane material. The method may further include the step of applying a reinforcing filler coated with a wetting agent on the inner die face, or the step of applying a reinforcing filler that is long fiber or chopped fiber, or the step of filling the cavity by a die casting process.

The present invention is further directed to a continuous loop polishing pad that is reinforced by a reinforcing filler which includes a sub-layer defining an inner diameter of the polishing pad that contains a reinforcing filler with an aspect ratio of at least 10, the reinforcing filler is oriented substantially in a circumferential direction of the continuous loop, and a top layer laminated to the sub-layer having a top surface defining an outer diameter of the polishing pad, wherein the sub-layer and the top layer are formed of a polymeric material.

In the continuous loop polishing pad that is reinforced by a reinforcing filler, the reinforcing filler may have a wetting agent coated on top, the reinforcing filler may be selected from the group consisting of reinforcing fiber, reinforcing whisker and non-woven fiber mat. The polymeric material may be polyurethane or any other suitable polymer, while the sub-layer may contain at least 10% by weight, and preferably 20% by weight of the reinforcing filler. The top layer does not contain any reinforcing filler. The top surface of the top layer may further include groves formed in a direction parallel to a circumferential derection of the loop. The reinforcing filler may be long fiber or chopped fiber, or a non-woven fiberglass mat.

BRIEF DESCRIPTION OF THE DRAWING

These and other objects, features, and advantages of the present invention will become apparent from the following detailed description and the appended drawings in which.

DETAILED DESCRIPTION OF THE PREFERRED EMBODIMENT

Figure 1A:
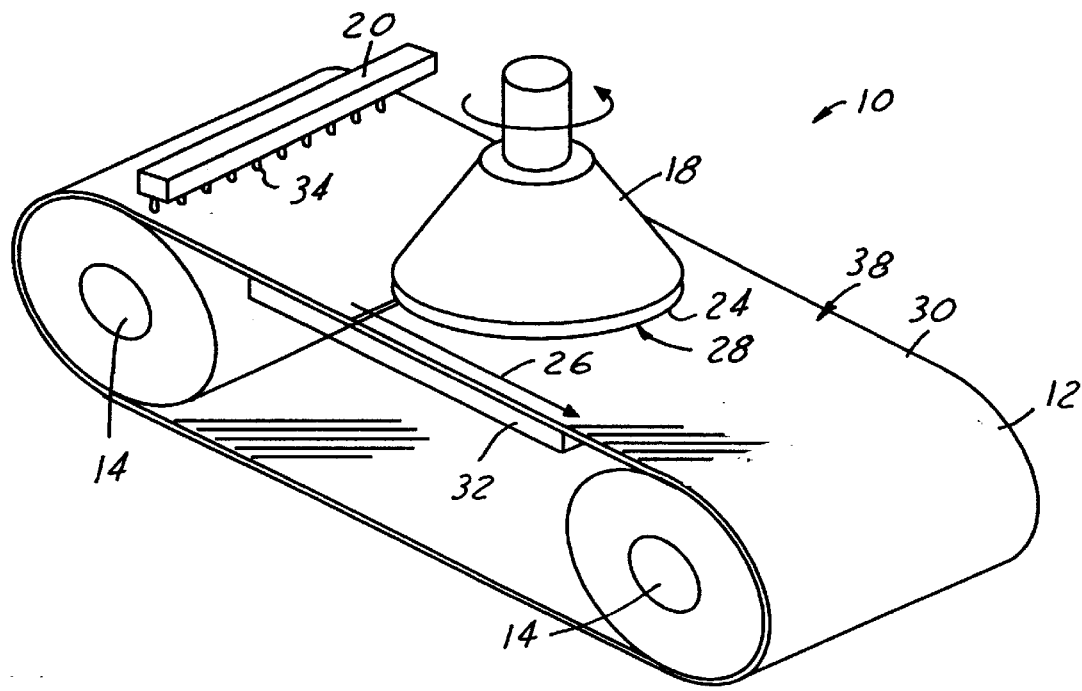
FIG. 1A is a perspective view of a conventional linear chemical mechanical polishing apparatus.
Figure 1B:
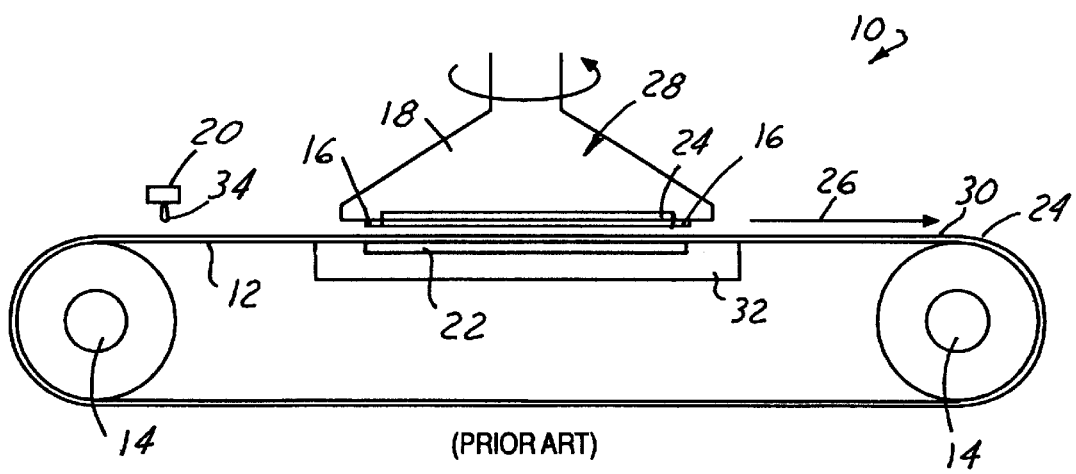
FIG. 1B is a side view of the conventional linear chemical mechanical polishing apparatus of FIG. 1A.

The present invention discloses a continuous loop polishing pad that is reinforced by a reinforcing filler such as a reinforcing fiber, a reinforcing whisker or a non-woven fiber mat. The polishing pad is constructed by a sub-layer and a top layer. The sub-layer defines an inner diameter of the polishing pad and contains a reinforcing filler that has an aspect ratio of at least 10 with the reinforcing filler being substantially oriented in a circumferential direction of the continuous loop. The top layer, which does not contain any reinforcing filler, is laminated to the sub-layer wherein a top surface of the top layer defines an outer diameter of the polishing pad. The sub-layer and the top layer are formed of a polymeric material such as polyurethane.

The invention further discloses a method for fabricating a polishing pad in a continuous loop wherein the pad is reinforced by a reinforcing filler such as a reinforcing fiber, a reinforcing whisker or a non-woven fiber mat. The method can be carried out by first providing a die that has a cavity in the shape of a continuous loop defined by an inner die face and an outer die face. A reinforcing filler that has an aspect ratio of at least 10 is then applied on the inner die face with the filler being substantially oriented in a circumferential direction of the continuous loop. The cavity is then filled partially with a polymeric material to encapsulate the reinforcing filler forming a sub-layer of the polishing pad, followed by a step of filling the cavity completely with the polymeric material such that a top layer is laminated to the sub-layer to form the polishing pad.

The present invention multi-layer (or composite) polishing pad significantly improves the pad stiffness in the circumferential direction of the continuous loop polishing pad. As a result, the creep of the polymeric material, i.e., a viscoelastic material, can be controlled and reduced after repeated usage of the polishing pad. The expansion of the pad caused by creep or elongation of the continuous belt can thus be prevented when the creep rate of the material is reduced. The composite layers can be formed of fiber reinforced layers, wherein the fiber may be long fiber, chopped fiber or whisker. For instance, the fiber material may be glass, aluminum oxide, silicon carbide or even metal such as stainless steel fiber.

By utilizing the present invention novel composite polishing pad, the pad creep rate is significantly reduced by the fiber reinforced layer. As a result, pad lifetime can be significantly increased.

The reinforcing fiber can also be long fiber, chopped fiber or whisker. In order to increase the tensile strength in the circumferential direction of the continuous belt, the fiber should be aligned in the circumferential direction of the belt while a polymeric material such as polyurethane is deposited to encapsulate the fiber matrix. A fiber reinforced layer of polymeric material is thus formed. The extremely high tensile strength of the fiber material greatly improves the tensile strength of the continuous belt when the fibers are aligned in the longitudinal direction, i.e., the circumferential direction of the belt.

Figure 3:
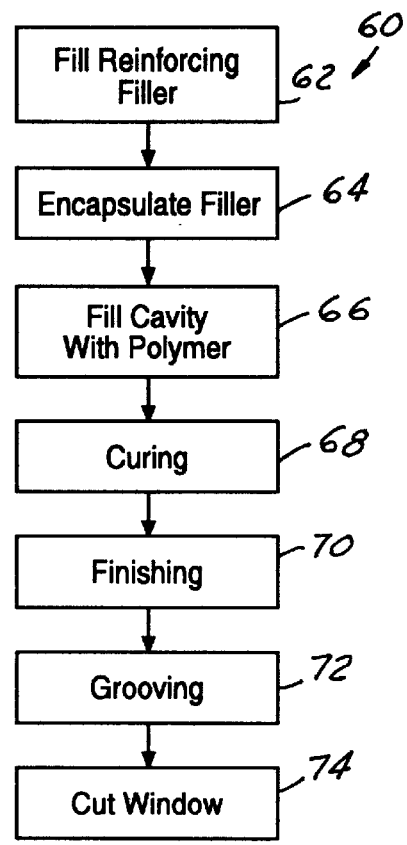
FIG. 3 is a process flow chart for the present invention polishing pad for the linear chemical mechanical polishing apparatus.

Referring now to FIG. 3, wherein a process flow chart 60 for the present invention process of forming a reinforced polishing pad for linear chemical mechanical polishing is shown. In the first step 62 of the process, a casting die is provided, followed by the application of a reinforcing filler with an aspect ratio of at least 10 on the inner die face. The casting die provided has a cavity in the shape of a continuous loop defined by an inner die face and an outer die face. The reinforcing filler may be sprayed or brushed onto the inner die face in such a way that the filler is substantially (at least 80%) oriented in a circumferential direction of the continuous loop. The process is then followed by step 64 in which the cavity is partially filled with a polymeric material to encapsulate the reinforcing filler to form a sub-layer of the polishing pad. In a subsequent step 66, the cavity is completely filled with the polymeric material forming a top layer that is laminated to the sub-layer to form the polishing pad.

Figure 2:
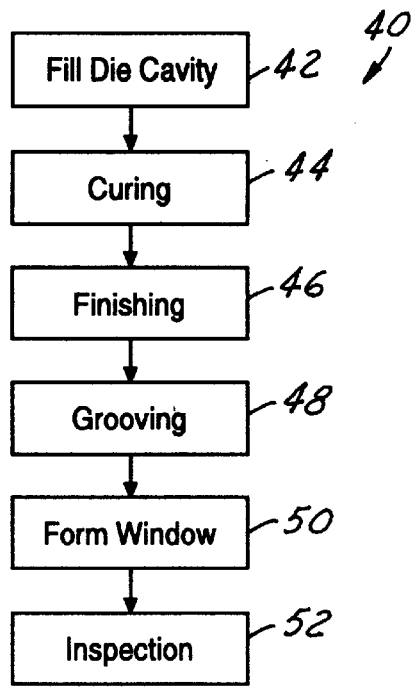
FIG. 2 is a process flow chart for the manufacturing of a conventional polishing pad for a linear chemical mechanical polishing apparatus.

Optionally, before the cavity is completely filled with the polymeric material, the sub-layer of the polishing pad formed in step 64 may be cured in a curing step at a suitable curing temperature for the polyurethane material, i.e., at about 150° C. A final curing step 68 is conducted following step 66 for filling the cavity completely with the polymeric material. The final curing temperature may be similar to the curing temperature used in curing the sub-layer of the polishing pad. The remaining process step 70 for finishing, process step 72 for forming grooves, and process step 74 for forming end point detection window are similar to those practiced in the conventional method for fabricating linear polishing pads shown in FIG. 2.

The reinforcing filler may be suitably selected from a reinforcing fiber, a reinforcing whisker and a non-woven fiber mat. For high volume fabrication process, the non-woven fiber mat may be most suitable since they can be readily positioned in a die. The reinforcing fiber may be a long fiber, i.e., longer than 5 mm, or chopped fibers, i.e., shorter than 5 mm. An important requirement for the reinforcing filler is that the filler must have an aspect ratio (length/diameter ratio) of at least 10, and preferably of at least 20. The total amount of the reinforcing filler in the sub-layer may be at least 10% by weight, and preferably at least 20% by weight. The top surface of the top layer of the polishing pad may further be provided with linear grooves that are formed parallel to the circumferential direction of the polishing pad. The linear grooves are advantageously used for transporting a slurry solution for improving the polishing uniformity of the linear CMP process.

Figure 4A:
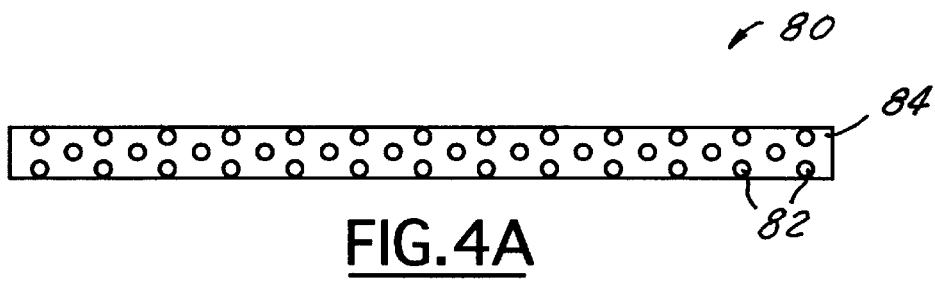
FIG. 4A is a cross-sectional view of a sub-layer of the present invention reinforced polishing pad.
Figure 4B:
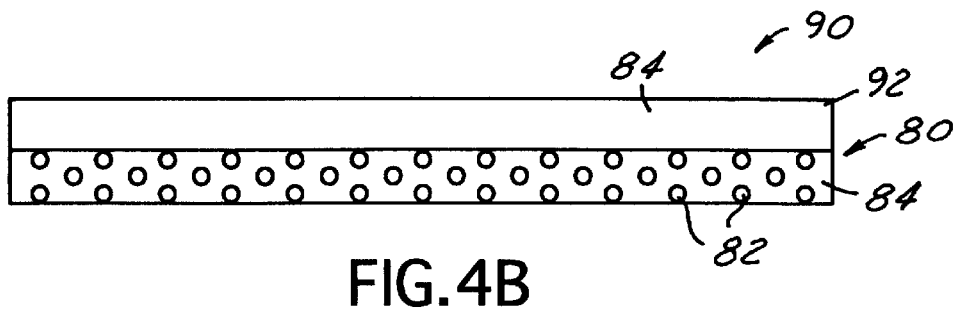
FIG. 4B is a cross-sectional view of the present invention polishing pad illustrating a top layer formed on the sub-layer.

A cross-sectional view of the present invention sub-layer for the polishing pad is shown in FIG. 4A, while a cross-sectional view of the completed polishing pad is shown in FIG. 4B. The sub-layer shown in FIG. 4A is taken in a cross-section to show the ends of the reinforcing filler 82 that are encapsulated in a polymeric material 84. The reinforcing fillers 82 are encapsulated in the polymeric material 84 in a direction that is parallel to the circumferential direction of the continuous loop polishing pad. After the formation of the sub-layer 80, the polishing pad 90 is formed by laminating a top layer 92 to the sub-layer 80. As shown in FIG. 4B, the same polymeric material 84 is used in the top layer 92 and in the sub-layer 80. While polyurethane is a suitable material for use in the present invention polishing pad, any other suitable polymeric material such as one that has high tensile strength, high temperature endurance and high chemical resistance may also be utilized in the present invention polishing pad.

The present invention novel continuous loop polishing pad that is reinforced by a reinforcing filler and a method for forming the reinforced polishing pad have therefore been amply described in the above description and in the appended drawings of FIGS. 3, 4A and 4B.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows.

What is claimed is:

1. A method for fabricating a polishing pad in a continuous loop reinforced by a reinforcing filler comprising the steps of:

providing a die having a cavity in the shape of a continuous loop defined by an inner die face and an outer die face;

applying a reinforcing filler having an aspect ratio of at least 10 on said inner die face, said filler being oriented substantially in a circumferential direction of said continuous loop;

filling said cavity partially with a polymeric material to encapsulate said reinforcing filler in a direction parallel to said circumferential direction of said continous loop to form a sub-layer of said polishing pad, said sub-layer containing at least 10% by weight of said reinforcing filler; and filling said cavity completely with said polymeric material laminating to said sub-layer to form said continuous loop polishing pad.

2. A method for fabricating a polishing pad in a continuous loop reinforced by a reinforcing filler according to claim 1 further comprising the steps of conducting a first curing process on said sub-layer and a second curing process on said polishing pad.

3. A method for fabricating a polishing pad in a continuous loop reinforced by a reinforcing filler according to claim 1 further comprising the step of forming surface grooves on an outer surface of said continuous loop polishing pad in a direction parallel to said circumferential direction of the loop.

4. A method for fabricating a polishing pad in a continuous loop reinforced by a reinforcing filler according to claim 1 further comprising the step of applying a reinforcing filler selected from the group consisting of a reinforcing fiber, a reinforcing whisker and a non-woven fiber mat.

5. A method for fabricating a polishing pad in a continuous loop reinforced by a reinforcing filler according to claim 1 further comprising the step of providing a die having a cavity in the shape of a circular loop.

6. A method for fabricating a polishing pad in a continuous loop reinforced by a reinforcing filler according to claim 1 further comprising the step of cutting an aperture in said polishing pad for end point detection.

7. A method for fabricating a polishing pad in a continuous loop reinforced by a reinforcing filler according to claim 1 further comprising the step of filling said cavity with a polyurethane material.

8. A method for fabricating a polishing pad in a continuous loop reinforced by a reinforcing filler according to claim 1 further comprising the step of applying a reinforcing filler coated with a wetting layer on said inner die face.

9. A method for fabricating a polishing pad in a continuous loop reinforced by a reinforcing filler according to claim 1 further comprising the step of applying a reinforcing filler that is a long fiber or chopped fibers.

10. A method for fabricating a polishing pad in a continuous loop reinforced by a reinforcing filler according to claim 1 further comprising the step of filling said cavity in a die casting process.

\* \* \* \* \*